Patented Jan. 13, 1942

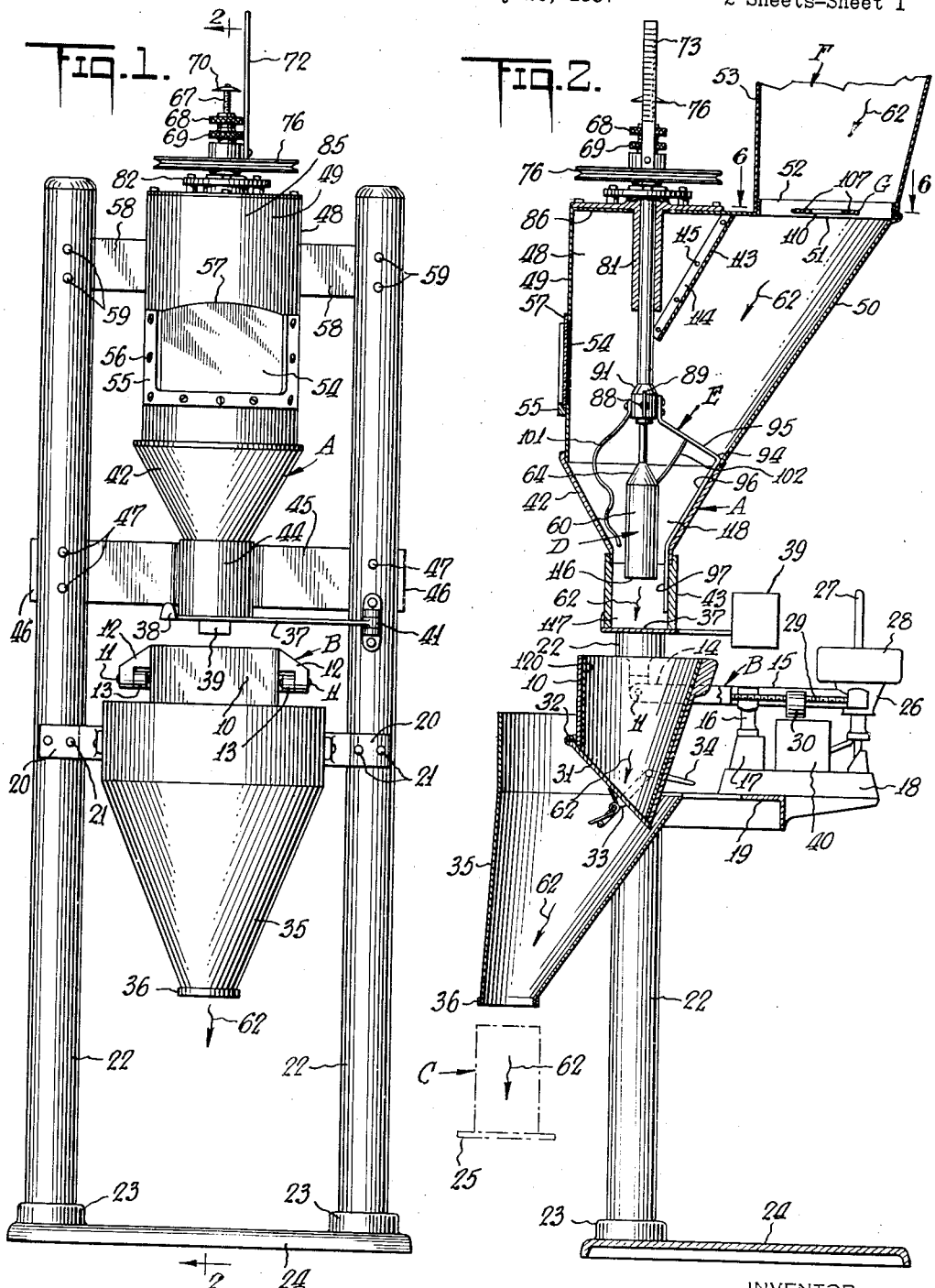

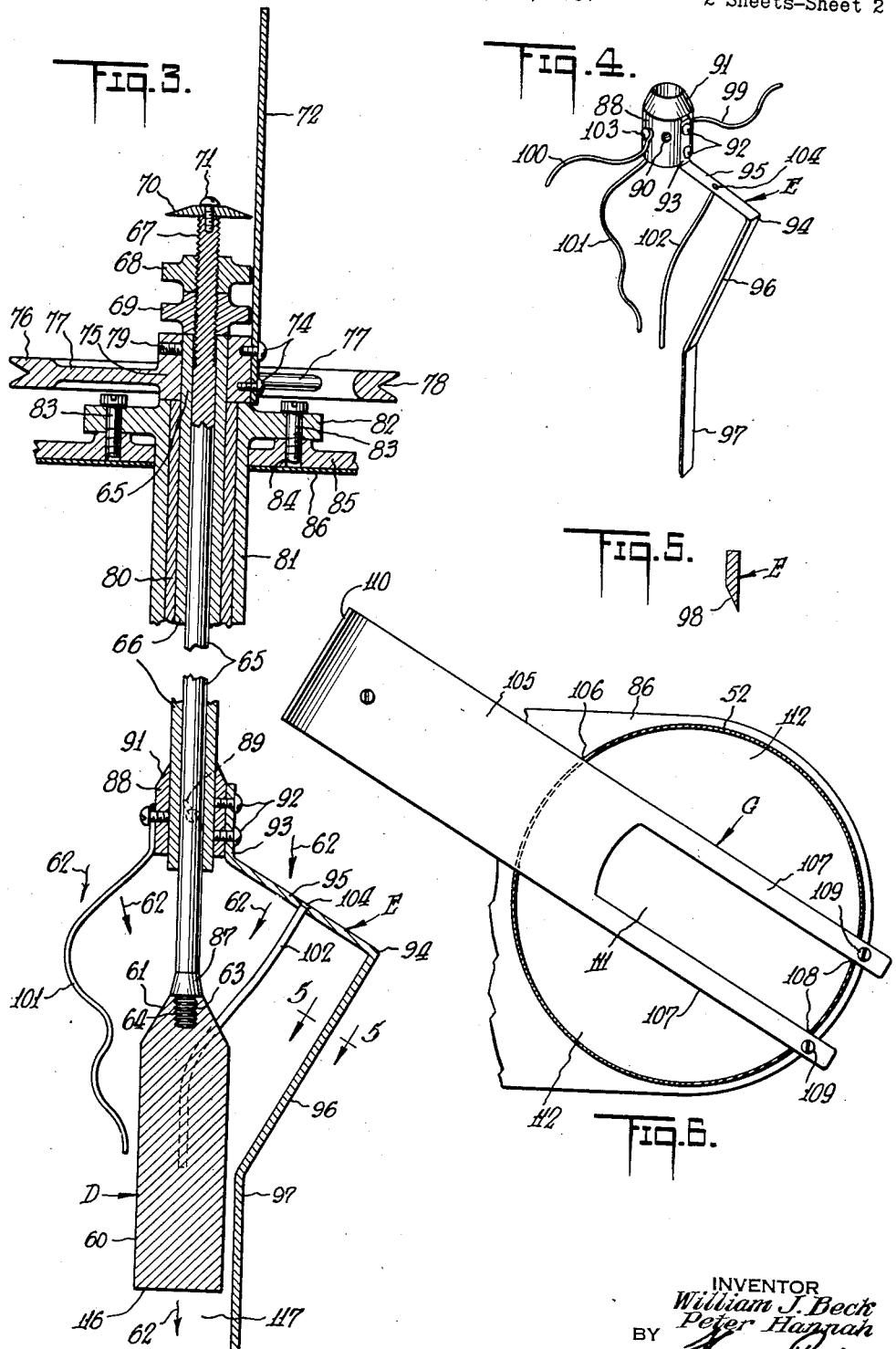

2,269,432

UNITED STATES PATENT OFFICE 2,269,432

FEEDING AND DISPENSING DEVICE

William J. Beck and Peter Hannah, Yonkers, N. Y.

Application July 26, 1937, Serial No. 155,643

18 Claims. (Cl. 249—42)

The present invention relates to a feeding or dispensing device and it particularly relates to a feeding or dispensing device which may be utilized in combination with weighing machines, proportioning apparatus, or other apparatus adapted to handle, segregate, feed or proportion predetermined quantities of granular, pulverulent, finely divided or powdered materials.

Although not restricted thereto, the present invention will be particularly described in connection with its application to automatic weighing machines, as for example, of the general type as disclosed in copending application, Ser. No. 432,077, filed February 28, 1930, now Patent No. 2,131,034, issued September 27, 1938. It is to be understood, however, that it may also be utilized with other types of weighing machines, or in any other connection where a uniform or predetermined feed is desired.

In operating such weighing machines, such as disclosed in said application, it is necessary to accurately segregate and weigh out batches of materials at relatively high frequencies. Such a weighing machine may include a feed hopper which receives the material to be segregated and weighed out and a balanced receptacle member which is connected to or forms part of a weighing device or scale.

The hopper is operated to feed material to the segregating or weighing receptacle, which segregating or weighing receptacle is periodically cut off from the hopper when a predetermined charge of material is received therein. After the oscillating or reciprocating receptacle forming part of the mechanism is disconnected from the hopper or is moved so as not to receive any more discharge from the hopper, it is itself opened and discharged to a bag, can or other container in which the material is merchandized and shipped, stored and/or sold.

In modern commercial practice it is desirable that as many charges or batches of material be most accurately weighed, and as many bags, cans or receptacles be filled per unit time as is possible and for this reason it is usually demanded that the weighing device or scale be operated at substantially high frequency.

When operating these machines at these relatively high frequencies and particularly where relatively small quantities of certain types of finely powdered materials must be handled, it has been found most difficult to assure accuracy in the proportioning and/or weighing of the same.

This difficulty becomes particularly apparent with very finely powdered materials, such as powdered chocolate pudding, ice cream powder, custard pie filling, cream of tartar, bicarbonate of soda, and so forth.

These materials will tend to cake and arch up in the feeding hopper or receptacle, will tend to adhere to the sides of the feeding bin, hopper or orifice and frequently will aerate when being fed, with resulting changes in specific gravity. These characteristics of such powdered materials will cause an irregularity in the feed and a lack of uniformity resulting in inaccuracy in the proportioning and weighing thereof.

It is therefore among the objects of the present invention to provide an improved feeding apparatus to be associated with a weighing machine or a proportioning mechanism, which will assure a uniform feed and a more accurate proportioning or weighing of the material being fed or dispensed.

It is therefore among the further objects of the present invention to provide an improved feeding apparatus to be associated with weighing or with other segregating apparatus; which is designed to operate at relatively high frequencies with maximum accuracy in the amount of material segregated or in the weights of each batch weighed out.

Another object of the present invention is to provide an improved automatic weighing apparatus to handle powdered materials of the character above described in which assurance will be had of relatively high frequency of operation and simultaneous high accuracy of segregation and weighing.

Another object is to provide an improved segregating, weighing, and/or proportioning arrangement particularly adapted for finely powdered or finely divided materials of the character above described, which will permit the accurate proportioning of relatively large or small amounts of said materials at relatively high frequency.

In accomplishing these objects it has been found most satisfactory to provide a dispensing arrangement or system in which the flow of the finely divided material may be readily controlled and in which it will be possible to vary the feed or flow of finely divided material through the system in accordance with the characteristics of the proportioning or segregating apparatus or the automatic weighing machines.

For example, it has been found desirable in connection with many types of automatic weighing machines of the type shown and described in said copending application above referred to, to feed the material into the weighing receptacle in a relatively large volume at the beginning of the weighing period until the weighing receptacle has received a substantial fraction of the mass or quantity to be weighed out.

Then the rate of feed of material from the hopper to the weighing receptacle is controlled so that there will be a relatively slow feed which will enable accurate proportioning of the quantity and which will assure cut-off of the weighing receptacle from the hopper when the predetermined amount of the finely divided material has collected in said weighing receptacle.

It is therefore among the further objects of the present invention to provide a means of operating a dispensing apparatus or feed hopper for an automatic weighing mechanism or other type of segregating machine, which will enable the material to be dumped or passed at a relatively great rate and at relatively large quantities into the weighing receptacle during the initial part of the weighing interval or period, and which will then decrease the rate of flow of the quantity being dispensed so that a more accurate determination and a more definite cut-off of the material will be obtained with resultant increased accuracy in weighing at shorter intervals.

Other objects will be obvious or will appear during the course of the following specification.

In accomplishing the above objects it has been found most satisfactory in one embodiment to provide a substantially vertically disposed inverted frustro-conical device into which the material may be fed from a suitable storage chamber or bin.

The lower portion of this frustro-conical device may be provided with a cylindrical sleeve depending therefrom. This cylindrical sleeve may be provided with an automatic or manually actuated closure device to permit material to flow from said combination cone and cylinder or hopper at predetermined intervals.

As shown in copending application this closing operation may be accomplished by means of a reciprocating gate automatically actuated to cut off the cone-cylinder hopper combination, when a suitable weighing receptacle has received a predetermined weighted charge of material, which is then to be dumped from said receptacle into a can, bag or other commercial container or if desired into a vat, tank, bin or water pipe line, or indeed to any place of consumption or usage.

If desired, however, the gate may be actuated in some other manner than is shown in said copending application and the combination conical and cylinder hopper may be caused to feed some other form of segregating device than an automatic weighing mechanism.

To accomplish the desired uniform feed from the hopper into the vessel or receptacle from which the material is to be delivered to a package or to a place of use, it has been found desirable to provide an adjustable plug which may be positioned eccentrically or concentrically, preferably the latter, within the feeding hopper or other passage through which the powdered material is descending. In conical or converging feeding devices this will tend to prevent the finely divided descending material from arching or drilling out and will decrease the pressure or impact between the particles of material as they approach the apexial portion of the feeding hopper. As a result, there will be a more uniform feeding of material through the feeding hopper.

In addition to this uniform feed, the spacing between the bottom of the plug and the closure or gate at the bottom of the cylindrical portion of the hopper will assure accumulation of an initial charge, which may be simultaneously dumped into the segregating or weighing receptacle at the beginning of the segregating or weighing period upon opening of the closure or gate.

In combination with this plug is preferably a scraper or sweeping device, said scraping or sweeping device being provided with a beveled forward edge which passes closely along the interior wall of the inverted cone and cylindrical portion of the hopper.

It has been found desirable and preferable to utilize a single sweep. At the same time a series of agitators are rotated with the sweep to agitate and break up the material in or about to flow into said hopper to assure a satisfactory operation thereof and to prevent caking of the finely powdered or pulverized material.

In one suitable construction, the adjusting plug is positioned at the bottom of a central rod member, which extends above the hopper and is provided with a lock nut and an adjusting nut enabling the height of the plug to be determined.

A graduated rule may be provided to determine the exact positioning of the plug in the cylindrical and conical portions of the hopper. Encircling the rod, is preferably a rotatable sleeve member which carries the scraper or sweeping arm and also stirring wires or agitators thereof.

In the drawings, which illustrate one of the many possible embodiments of the present invention, given by way of illustration and not by way of limitation, since many variations and changes are possible without departing from the spirit and scope of the invention:

Fig. 1 is a front elevation of the dispensing device associated with an automatic weighing mechanism, shown by way of illustration, which may be of the general type of that disclosed and described in said copending application;

Fig. 2 is a cross-sectional view upon the line 2—2 of Fig. 1;

Fig. 3 is a fragmentary longitudinal sectional view of the adjustable dispensing arrangement with the associated sweep and agitators upon an enlarged scale;

Fig. 4 is a top perspective view of the sweep mechanism, as shown in Fig. 3, upon a slightly decreased scale;

Fig. 5 is a cross-section upon the line 5—5 of Fig. 3 upon a slightly increased scale showing the shape of the main sweep blade;

Fig. 6 is a transverse sectional view upon the line 6—6 of Fig. 2 upon an enlarged scale showing the inlet control feed for regulating the rate of passage of the finely divided or other material to be weighed and segregated to the feed hopper.

Referring to Figs. 1 and 2, the hopper or dispensing device A feeds the segregating or weighing device B, which in turn feeds the material to a plurality of bags, cans, or containers indicated by dotted lines at C. The hopper receives the adjustable plug D which may be fixed or rotatable and the rotatable agitating mechanism E. The hopper is fed from the bin F which has a controllable or slidable gate G.

The weighing apparatus which forms no part of the present invention, except as it may represent a novel combination with the dispensing hopper A and its associated mechanism D, E, F and G, has a weighing bucket or balanced receiver 10 which is pivotally connected at 11 by the arms 12 to the ends 13 of the yoke 14 of the pivoted scale beam 15. The pivoted scale beam 15 is mounted at 16 upon a base 17 which is carried by the plate 18. The plate 18 is carried on the bracket 19. The arms 20 of the bracket 19 are connected at 21 to the posts 22. These posts 22 are connected by the collars 23 to the base plate 24. The plate 24 may be positioned adjacent to or associated with a table or moving belt 25 for receiving the cans, bags or containers to be filled with the segregated or weighed charges.

As shown in Fig. 2, the right end of the scale beam 15 carries a pan 26 having an upright pin 27 designed to receive the weights 28. The scale is also provided with the cross bar 29 having a sliding weight 30.

The bucket 10 is provided with a swinging bottom closure or gate 31 pivotally connected to the side of said bucket at 32 and controlled by the swinging latch 33 having a control arm 34. The arm 34 opens the gate 31, when the predetermined segregated charge has been received therein, said charge being dumped into a funnel 35 which at its lower end 36 discharges into the bags, cans or other containers C.

The hopper A is provided with a closing gate 37 which may be manually controlled by the handle 38 (see Fig. 1) or automatically controlled by the actuating mechanism diagrammatically indicated at 39 in Fig. 1 in the manner more fully described in Patent No. 2,131,034.

In said copending application above referred to is described an automatically controlled mechanism diagrammatically indicated at 40 in Fig. 2, which may actuate said trip lever 33 through its arm 34 and said reciprocating gate 37 through the mechanism 39, to close said gate 37 and open said gate 31, each time a proper amount of material is collected in the bucket 10 and is to be discharged into the funnel 35 and into the can, bag or container C.

The construction thus far described forms no part of the present invention, which is particularly directed to a dispensing arrangement to be now described.

As shown in Figs. 1 and 2, the hopper includes an inverted conical member 42 provided with a depending sleeve 43 which sleeve is supported by the curved portion 44 of the bracket 45. The end portions 46 of said bracket are connected at 47 to the posts 22.

The conical portion 42 communicates at its upper end with the enlarged extension 48 which is of cylindrical conformation at its forward side 49 with an oblique shute portion at its rear 50.

The rear end of the portion 50 is provided with an opening at 51 encircled by a sleeve 52, which communicates with the element 53 leading to a suitable storage chamber or forming part of a bin for the material to be dispensed, segregated, and/or weighed.

The cylindrical portion 49 of the extension 48 is provided with a curved window 54 having the frame 55 which is screwed at 56 against the cylindrical portion 49 to hold it in position.

The upper end 57 of the window 54, which is normally above the level of finely divided solid material in the extension 48, is not framed so that the glass may be slid upwardly out of position in the frame 55.

The upper portion of the extension 48 is connected by the supporting brackets 58 to the post 22, said supporting brackets being screwed or riveted to said posts at 59.

The general construction just now described forms no essential part of the invention except in so far as it cooperates with an adjustable plug D, the associated stirring or agitating device E and the adjustable inlet G, which elements cooperate together to accomplish the objects of the present invention and may be utilized in connection with other types of enclosures than specifically described in connection with the numerals 42 to 59, all inclusive.

A primary distinctive feature of the present invention is the plug D shown in small scale in Fig. 2 and in large scale in Fig. 3.

It will be noted that the plug D has a cylindrical portion 60 and fits concentrically within the conical portion 42 and the cylindrical portion 43 of the hopper construction A. The upper portion of the plug 60 is beveled upwardly and inwardly to aid downward flow of the finely divided material in the directions indicated by the arrows 62.

The plug at its upper end is provided with a tapped recess 63, which receives the threaded stud 64 at the bottom of the rod 65, the conical end portion 87 of which abuts the upper tapered portion 61, when the stud 64 has been screwed home.

The rod 65 extends upwardly through the sleeve 66 and is threaded at its upper end 67 to receive the lock nut 68 and the adjusting nut 69.

To the upper end of the rod is attached the beveled disk 70 which is attached to said rod 65 by the screw 71. The beveled disk 70 cooperates with the upright scale 72 which is graduated as indicated at 73 in Fig. 2. The lower end of said scale is connected by the screw 74 to the hub 75 of the pulley member 76.

The pulley member 76 is provided with spokes 77 and with the exterior groove 78 to receive a belt (not shown) driven from a motor or other source of power.

The hub 75 is connected by the set screw 79 to the sleeve 66, said sleeve 66 extending downwardly within an outside bearing sleeve 80. The sleeve 80 is received in the depending sleeve member 81, which at its upper end is provided with an outstanding flange 82 connected by the bolts 83 to the tapped holes 84 in the top plate 85, said plate 85 extending over the cover 86 of the extension 48. The sleeve 81 extends downwardly to the end of the sleeve 80.

To the lower end of the sleeve 66 is connected the sleeve 88 by the pin 89 fitting in the opening 90 (see Figs. 2, 3 and 4).

The upper portion of the sleeve 88 is beveled at 91 to assist downward flow of the powdered material in the direction indicated by the arrows 62. Connected to the side of the sleeve 88 by the screws 92 is the upper end 93 of the sweep or blade member 94 having an outstanding arm 95 to bring the conical sweep portion 96 closely against the cone 42 of the hopper member A. At the lower end of the cone 42, the arm 94 is bent vertically downwardly at 97 to sweep over the inside surface of the cylindrical portion 43 of the hopper A.

As indicated in Fig. 5, the forward end of the sweep arm portions 96 and 97 are beveled at 98 to cut close to the interior walls of the conical portion 42 and the cylindrical portion 43 of the hopper A and assure that the material will be dislodged from said walls and will flow downwardly into the lower end of the cylinder 43.

The sleeve 88 also carries the agitating wires or rods 99, 100, 101 and 102. The wires 99, 100 and 101 are attached to the sides of the cylinder 88 by the screws 103, while the sweep wire 102 is riveted as indicated best at 104 to the portion 95 of the blade 94.

As indicated in Figs. 2, 3 and 4, two of the agitating or sweeping wires 99 and 100 extend laterally or substantially horizontally from the sleeve 88 to sweep over different areas laterally of the sleeve 88 and break up the finely divided or pulverized material in this space, while the depending wires 101 and 102 do the same in the space in the conical portion 42 toward its junction with the cylindrical portion 43.

The upper portion of the oblique extension 50 is provided the sliding gate G (see Fig. 6) consisting of a sliding plate 105 which extends through the slots 106. At one side of the sleeve 52 the plate 105 is bifurcated into the two arms 107, by removing the central portion 111, said bifurcated portion 107 extending through the slots 108. The bifurcated portions 107 receive the stop screws 109 which contact the side wall 52 to limit withdrawal of the plate 105.

The plate 105 may be turned upwardly as indicated at 110 or provided with a handle to enable it to be adjustably positioned in the opening formed by the sleeve 52.

In operation the finely divided, pulverized, or finely ground coffee, chocolate pudding, ice cream powder, custard pie filling, cream of tartar, bicarbonate or any other finely divided material having caking tendencies is placed in the bin F. The gate or sliding gate 105 is then adjusted so as to permit a suitable area 111 between the arms 107, the area 112 remaining constant (see Fig. 6). This will control the feed of material into the inclined shute portion 50.

It will be noted that as the plate 105 is slid in and out through the slots 106 and 108 that the material heaped up on the plate or on the arms 107 will be swept off inside of the cylinder 52 and into the oblique shute 50 regardless of the direction of adjusting movement of said plate 105.

The baffle plate 113 attached at 114 by the screws 115 to the side walls of the extension 48 will direct the flow of material through the shute 50 down into the hopper A. The conical upper ends 91 of the sleeve 88 and 64 of the plug 60 afford a minimum obstruction to the downward flow of said finely powdered material in the direction of the area 62.

By loosening the lock nut 68 and adjusting the nut 69, the plug D has been previously set so that its lower end 116 will be a predetermined distance above the swinging cut-off gate 37. This distance is determined by setting the beveled disk 70 at a determined height in respect to the scale 73 as indicated in Fig. 2.

After the setting, the nuts 68 and 69 are tightened together and the motor is caused to rotate the pulley 76 through a belt (not shown). The pulley will cause rotation of the sleeve 66, the connected sweep blade 94, and the agitating wires 99, 100, 101 and 102.

During this rotating operation the material will flow downwardly past the adjustable inlet plate 105 through the oblique shute 50, through the conical element 42 and the cylindrical element 43 to accumulate beneath the plug 60 in the portion 117 below said plug.

The rate of feed and the interval of closure of the gate 37 is preferably such that the material will substantially fill the space 117 and also pile up around the plug 60 into the conical portion 42.

The continuous action of the single blade 94 and the sweep wires 99 to 102 will assure settling and the movement of the finely powdered material around and below the plug 60 during the interval that the gate 37 is closed. As soon as the previous charge of material has been segregated or dumped, as for example from the bucket 10 by way of opening gate 31 into the funnel 35 and from there into the bag or other container C, the gate 31 will be closed and the gate 37 will be opened.

As pointed out before, this may be accomplished either manually or automatically. As soon as the gate 37 is opened the collected charge in the space 117 will be immediately dumped into the bucket 10 and it is desirable that such charge should substantially constitute a major portion of the predetermined charge to be segregated or weighed.

Then for the residual period of the weighing period, the material will sprinkle or fall down through the annular space between the cone 42 and the cylinder 43 and the plug 60, gradually making up the predetermined charge or volume to be weighed or segregated. Since this is a gradual feed, it is possible to cut the same off most definitely by the swinging gate 37 when the scale device B indicates that the predetermined charge has been weighed out.

As soon as the gate 37 is closed, the sweeping blade 94 and the agitating wires 99 to 102 will assure that the finely powdered material will again fill up the bottom space 117 and the annular space 118 so as to prepare for the next segregating or weighing operation.

By thus providing for a quick dumping of a major portion of the charge to be segregated away and then a gradual dispensation to enable gradual cutting off, it is possible to operate the apparatus most satisfactorily to where as small quantities as ¼ to ⅛ pound or even as large as 2 to 4 pounds at a relatively high rate of 27, or 28, or even 30 weighings per minute.

It is usually desirable that the volume 117 beneath the plug 60 accommodate from 25 to 50 per cent, or sometimes even up to 75 to 90 per cent, of the total charge to be weighed, and this charge should be dumped relatively suddenly in the initial part of the weighing or segregating period so that any vibration of the bucket 10 will have ceased by the end of the weighing period at the time when the fine stream is gradually flowing into the bucket to complete the charge.

It is an essential feature of the present invention that a single sweeping blade 94 be combined with said adjustable plug 60, a double diametrically opposite blade construction not having been found to be most satisfactory for the purpose and objects above described.

The adjustable plate 105 merely cooperates in assisting the feed through the oblique shoot 50. It is also possible if desired to line the bucket 10 and the funnel 35 with stiff red cardboard paper 120 which gradually assists the flow of finely powdered materials therefrom and minimizes the tendency of the caking materials to stick or adhere to the walls of these respective containers.

The invention however is not intended to be restricted to any particular construction or arrangement of parts, or to any of the various details thereof, herein shown and described, as the same may be modified in various particulars or may be applied in many varied ways without departing from the spirit and scope of the claimed invention. The practical embodiments herein illustrated are described merely as showing some of the various features entering into the application of the invention.

We claim:

1. A dispensing apparatus to dispense a predetermined charge comprising a cylindrical dispenser, an inwardly diverging vessel continuous with said cylindrical dispenser to feed said dispenser, a gate to cut off said dispenser, an agitator rotating within said dispenser and a centrally located cylindrical plug extending axially through the upper part of said cylindrical dispenser the space below which serves to permit collection of an amount of material less than a predetermined charge, to be segregated prior to opening said gate, said segregated material being adapted to be dumped at the beginning of the dispensing period when the gate is opened.

2. A dispensing apparatus comprising an inverted conical member, a cylindrical member depending therefrom, a reciprocal gate member closing the bottom of said cylindrical member, a single sweep agitating member, and an adjustable axially located cylindrical plug forming an annular passageway in the upper part of said cylindrical member and providing a pocket in the lower part of said cylindrical member to regulate the feed through said conical and cylindrical members.

3. In a dispensing device, an inverted conical member, a cylindrical member depending therefrom, an adjustable axially located cylindrical plug forming an annular passageway in the upper part of said cylindrical member and providing a pocket in the lower part of said cylindrical member positioned concentrically within said cylindrical and conical members and a sweeping device to agitate and stir the materials being dispensed while they are passing downward through said conical and cylindrical members.

4. In a dispensing device for materials tending to cake, which device may operate with an automatic weighing machine or another segregating apparatus, said device comprising a hopper, consisting of an inverted conical member with a depending cylindrical sleeve, a gate at the bottom of said cylindrical sleeve to periodically cut off said sleeve, an adjusting axially located cylindrical plug forming an annular passageway in the upper part of said cylindrical sleeve and providing a pocket in the lower part of said cylindrical sleeve, and a rotating sweep device for agitating the materials passing down around said plug and into the bottom of said sleeve.

5. A dispensing device for an automatic weighing machine or other segregating apparatus, comprising a cylindrical hopper, including an upwardly diverging member, adjustable gate means for controlling the feeding the finely divided material into the top of the hopper, means for cutting off the discharge of material from the bottom of the hopper, a cylindrical plug in said hopper for providing a pocket at the bottom of the hopper to permit the accumulation of a charge of said finely divided material, and means to continuously agitate the material passing through said hopper.

6. In a dispensing device for finely divided material designed to cooperate with automatic weighing machines and other segregating machinery, a cylindrical feed hopper for finely divided material, a gate at the bottom of said hopper to cut off discharge therefrom, an adjustable axially located cylindrical plug forming an annular passageway in the upper part of said cylindrical member and providing a pocket in the lower part of said cylindrical member, in which the material being dispensed may collect when the hopper has been cut off, and means for continuously agitating said finely divided material.

7. In a feeding hopper, a cylindrical spout member, a gate to cut off the bottom of said spout member, an axially located cylindrical plug forming an annular passageway in the upper part of said cylindrical member and providing a pocket in the lower part of said cylindrical member inserted downwardly into said spout member, a rod extending upwardly through said hopper, connected at its lower end to said plug, means at the top of said rod to enable measured adjustment of the position of said plug and a stirring device to agitate the material in the space above and alongside of said plug.

8. In a feeding hopper, a cylindrical spout member, a gate to cut off the bottom of said spout member, an axially located cylindrical plug forming an annular passageway in the upper part of said cylindrical member and providing a pocket in the lower part of said cylindrical member inserted downwardly into said spout member, a rod extending upwardly through said hopper, connected at its lower end to said plug, means at the top of said rod to enable measured adjustment of the position of said plug and a stirring device to agitate the material in the space above and alongside of said plug, said stirring device comprising a blade, the forward edge of which is beveled and which sweeps along the interior wall of said spout and a plurality of wires extending laterally outwardly into the space above said plug and vertically downwardly into the space around said plug, to stir up the material, said wires each sweeping through different areas.

9. In a feeding hopper, a cylindrical spout member, a gate to cut off the bottom of said spout member, an axially located cylindrical plug forming an annular passageway in the upper part of said cylindrical member and providing a pocket in the lower part of said cylindrical member inserted downwardly into said spout member, a rod extending upwardly through said hopper, connected at its lower end to said plug, means at the top of said rod to enable measured adjustment of the position of said plug and a stirring device to agitate the material in the space above and alongside of said plug, said stirring device being carried by a rotatable sleeve encircling said depending rod.

10. In an automatic weighing machine, of the type comprising a weighing bucket; a spout feeding material into said bucket during the weighing period, a reciprocable gate periodically moved between said spout and said bucket to stop feed of material from said spout to said bucket when the weighing has been completed, and a plug positioned inside of said spout, adjustably mounted to permit regulation of the pocket within said spout enabling a major portion of the charge of material to be collected during intervals when said feed has been stopped.

11. In an automatic weighing machine mechanism of the type comprising a weighing bucket, an associate scale mechanism to discharge said bucket when a predetermined weight has been received therein; a hopper to discharge material to be weighed into said bucket, a reciprocable gate to cut off said hopper from said bucket when the weighing has been completed and said bucket is being discharged, a plug concentrically positioned in said hopper adjustable toward and away from said gate to provide a pocket between the plug and the gate within which the finely divided materials may accumulate during the intervals when the gate is closed, an extension rod attached to said plug at its lower end and provided with adjusting nuts on its upper end, which upper end is positioned above the hopper, a graduated scale at the top of said hopper in adjuxtaposition to the top of said rod, to enable convenient adjustment of said rod and corresponding adjustment of said plug, an agitator positioned above said plug adapted to rotate within said hopper to agitate and break up the material therein and to scrape the interior side walls of said hopper, a sleeve carrying said agitator encircling and extending upwardly around said rod and driving means for said sleeve at the top of said hopper.

12. The mechanism of claim 11, said hopper being also provided with an adjustable inlet to regulate the feed of material into the hopper.

13. A dispensing hopper, particularly adapted to be associated with weighing machines, comprising a cylindrical spout, an inverted conical member extending upwardly from said spout, a gate to cut off the bottom of said spout and prevent discharge from said hopper, a chute structure on said hopper, an inlet feeding the top of said chute structure, and a sliding slotted plate in said inlet, said plate and said conical member cooperating together to regulate the feed through the hopper.

14. A dispensing hopper, particularly adapted to be associated with weighing machines, comprising a cylindrical spout, an inverted conical member extending upwardly from said spout, a gate to cut off the bottom of said spout and prevent discharge from said hopper, a chute structure on said hopper, an inlet feeding the top of said chute structure, a sliding slotted plate in said inlet to regulate the feed into the inlet, an adjusting plug concentrically positioned in said cylindrical spout and conical member and spaced from said gate so as to form a recess in the lower portion of the spout in which finely divided material to be dispensed may be collected, a rod extending upwardly through the hopper structure attached at its lower end to the plug and at its upper end to an adjustment device to regulate the height of the plug, a stirring device positioned alongside of and above said plug to agitate and break up the materials in the space above and alongside of the plug, a rotatable sleeve carrying said stirring device and extending upwardly and encircling said rod, and means adjacent the top of the hopper for rotating said sleeve, said sliding slotted plate and said adjusting plug cooperating together to regulate the flow of material through said hopper.

15. In a dispensing device, inner and outer cylindrical members forming a concentric passageway, said members being positioned upon a substantially vertical axis, and said outer cylindrical member extending substantially below the lower end of said inner cylindrical member to form a cylindrical pocket in said outer member below said inner member, and said outer member being provided with an upwardly diverging frustro-conical hopper, said inner cylindrical member extending substantially up into the lower portion of said frustro-conical hopper and means to adjust the position of said inner cylindrical member in respect to said outer cylindrical member.

16. In a dispensing device, inner and outer cylindrical members forming a concentric passageway, said members being positioned upon a substantially vertical axis, and said outer cylindrical member extending substantially below the lower end of said inner cylindrical member to form a cylindrical pocket in said outer member below said inner member, and said outer member being provided with an upwardly diverging frustro-conical hopper, said inner cylindrical member extending substantially up into the lower portion of said frustro-conical hopper and means to adjust the position of said inner cylindrical member in respect to said outer cylindrical member, said last-mentioned means including a rod extending upwardly through said hopper and extending beyond the upper end of said hopper, an adjustable mount for said rod at the upper end of said hopper, a scale to enable determination of the amount of adjustment of said rod at the upper end of said hopper and means to lock said rod in any adjusted position.

17. In a dispensing device, inner and outer cylindrical members forming a concentric passageway, said members being positioned upon a substantially vertical axis, and said outer cylindrical member extending substantially below the lower end of said inner cylindrical member to form a cylindrical pocket in said outer member below said inner member, and said outer member being provided with an upwardly diverging frustro-conical hopper, said inner cylindrical member extending substantially up into the lower portion of said frustro-conical hopper and means to adjust the position of said inner cylindrical member in respect to said outer cylindrical member, said last-mentioned means including a rod extending upwardly through said hopper and beyond the upper end of said hopper, agitating members to rotate within the lower portion of said hopper and in the annular passage between said cylindrical members, a sleeve mounted upon said rod carrying said agitating members, said sleeve extending to above the upper end of said hopper and means to rotate said sleeve at the upper end of said hopper.

18. In a dispensing device, a vertical hopper member, the upper portion of which is provided with downwardly converging side walls and the lower portion of which is provided with substantially vertical side walls, said downwardly converging side walls and said vertical side walls forming a substantially continuous passageway, a reciprocable horizontal gate to cut off the bottom of said vertical side wall portion of said hopper and an elongated plug extending vertically through the central portion of the upper part of the vertical side wall portion to form an annular passageway in the upper portion of said vertical side wall portion and a pocket in the lower part of said vertical side wall portion above said gate and also extending into the lower part of said converging side wall portion and means to adjust the position of said plug.

WILLIAM J. BECK.
PETER HANNAH.